United States Patent
Gervais

(10) Patent No.: US 12,465,028 B2
(45) Date of Patent: Nov. 11, 2025

(54) RACEWAYS AND SYSTEMS THEREOF

(71) Applicant: Iterrro, Inc., Balaton, MN (US)

(72) Inventor: Robert H. Gervais, Currie, MN (US)

(73) Assignee: Iterro, Inc, Balaton, MN (US)

( * ) Notice: Subject to any disclaimer, the term of this patent is extended or adjusted under 35 U.S.C. 154(b) by 6 days.

(21) Appl. No.: 17/477,189

(22) Filed: Sep. 16, 2021

(65) Prior Publication Data

US 2022/0000081 A1    Jan. 6, 2022

Related U.S. Application Data

(63) Continuation of application No. 16/433,887, filed on Jun. 6, 2019, now abandoned.

(60) Provisional application No. 62/681,882, filed on Jun. 7, 2018.

(51) Int. Cl.
  *A01K 61/90* (2017.01)
  *A01K 61/59* (2017.01)

(52) U.S. Cl.
  CPC ............. *A01K 61/90* (2017.01); *A01K 61/59* (2017.01)

(58) Field of Classification Search
  CPC ........ A01K 61/90; A01K 61/50; A01K 61/59; A01K 63/00
  USPC ................. 119/228, 204–207, 211, 213, 200
  See application file for complete search history.

(56) References Cited

U.S. PATENT DOCUMENTS

| | | | |
|---|---|---|---|
| 3,766,888 A | 10/1973 | Wiegardt | |
| D242,813 S | 12/1976 | Walker | |
| 4,368,691 A | 1/1983 | Brune | |
| 4,593,647 A | 6/1986 | Sorgeloos et al. | |
| 4,813,377 A * | 3/1989 | Riche | A01K 80/00 37/316 |
| 5,849,185 A | 12/1998 | Judy | |
| 6,932,025 B2 | 8/2005 | Massingill et al. | |
| 8,336,498 B2 | 12/2012 | Lawrence | |
| 8,985,055 B2 | 3/2015 | Lawrence | |
| 10,039,244 B2 * | 8/2018 | Shoham | A01K 61/00 |
| 2005/0034676 A1 | 2/2005 | Taylor et al. | |
| 2005/0120970 A1 * | 6/2005 | Massingill | A01K 63/10 119/216 |
| 2010/0071629 A1 | 3/2010 | Wu et al. | |
| 2010/0294202 A1 * | 11/2010 | Lawrence | A01K 61/59 119/213 |

(Continued)

FOREIGN PATENT DOCUMENTS

| | | |
|---|---|---|
| CN | 101828534 A | 9/2010 |
| CN | 104381167 A | 3/2015 |

(Continued)

OTHER PUBLICATIONS

"Extended European Search Report received for European Patent Application No. 19815333.0, mailed on Dec. 23, 2021", 9 pages.

(Continued)

*Primary Examiner* — Andrea M Valenti
(74) *Attorney, Agent, or Firm* — Merchant & Gould P.C.

(57) ABSTRACT

A raceway for collecting molts and removing waste comprises a sloped base with an apex, a divider extending upward from the apex, two side walls, each opposing and parallel to the divider sufficient to form two elongated channels on the sloped base; and at least two tapered ends in fluid communication with the channels, each tapered end including an end wall, a pit, and a sloped floor extending from the sloped base to the end wall or pit.

14 Claims, 17 Drawing Sheets

(56) References Cited

U.S. PATENT DOCUMENTS

2017/0354128 A1   12/2017  Budd et al.
2018/0110208 A1*  4/2018  Lawrence .............. A01K 61/00
2018/0116184 A1   5/2018  Kemp et al.
2019/0364857 A1*  12/2019  Minami ............... A01K 63/065

FOREIGN PATENT DOCUMENTS

| | | | | |
|---|---|---|---|---|
| CN | 106614233 A | | 5/2017 | |
| CN | 107114296 | * | 9/2017 | ............. A01K 63/00 |
| CN | 107114296 A | | 9/2017 | |
| DE | 20 2017 003 465 U1 | | 10/2017 | |
| JP | S4835119 B1 | | 10/1973 | |
| JP | 2003284451 A | | 10/2003 | |
| JP | 4243068 B2 | | 1/2009 | |
| JP | 2015-53872 | * | 3/2015 | ............. C12M 1/00 |
| WO | 2016/077928 A1 | | 5/2016 | |
| WO | 2016/172702 A1 | | 10/2016 | |
| WO | WO 2016/160141 | * | 10/2016 | |

OTHER PUBLICATIONS

Non-Final Office Action for CN Application No. 201980051635.5 Mailed Oct. 10, 2022, 7 Pages.
Office Action for ID Application No. P00202010607, Mailed on Oct. 17, 2022, 2 Pages.
International Search Report and Written Opinion for Application No. PCT/US2019/35824 mailed Aug. 22, 2019.

* cited by examiner

RACEWAYS AND SYSTEMS THEREOF

CLAIM OF PRIORITY

This application is a Continuation of U.S. application Ser. No. 16/433,887 filed on Jun. 6, 2019, now abandoned, which claims the benefit of U.S. Provisional Application No. 62/681,882, filed on Jun. 7, 2018, and each of these applications are incorporated herein by reference in their entirety. A claim of priority to all, to the extent appropriate, is made.

BACKGROUND

Conventional raceways and raceway designs fail to maximize recovery of molts, which hold significant value in the marketplace. Another shortcoming of these raceways and raceway designs is that they fail to adequately remove harmful wastes from the raceway.

Accordingly, it would be desirable to provide enhanced raceways and raceway designs that maximize the recovery of molts and minimize susceptibility to disease.

SUMMARY

In general, embodiments of the present disclosure describe raceways and raceway systems.

Accordingly, embodiments of the present disclosure describe a raceway comprising a sloped base with an apex, a divider extending upward from the apex, two side walls, each opposing and parallel to the divider sufficient to form two elongated channels on the sloped base; and at least two tapered ends in fluid communication with the channels, each tapered end including an end wall, a pit, and a sloped floor extending from the sloped base to the end wall or pit.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1A:
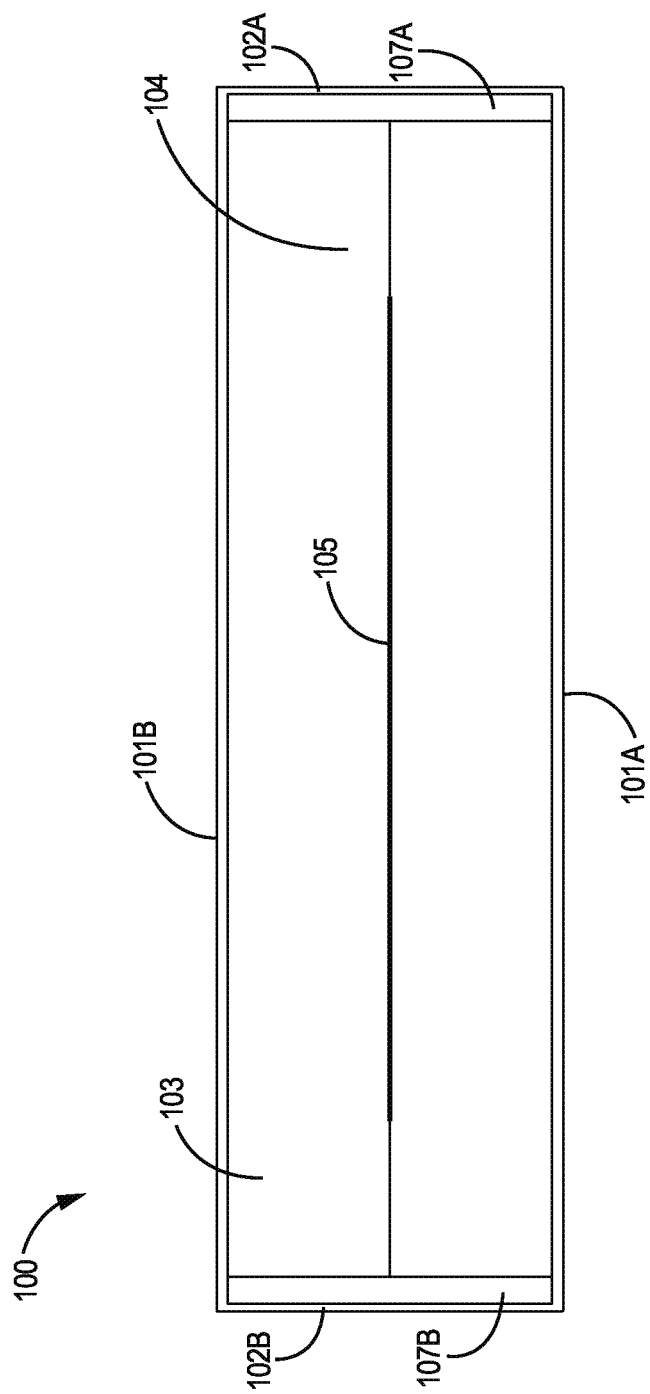
FIGS. 1A and 1B are an aerial view and a perspective view of a two-channel raceway 100, respectively, according to one or more embodiments of the present disclosure.

The invention of the present disclosure relates to raceway systems for rapid and efficient removal of components that are generated and/or present during shrimp production. In general, as the residence times of these components increases, the shrimp molts are more likely to dissolve and/or be consumed by shrimp and the raceway system is more likely to be susceptible to disease. Accordingly, the invention of the present disclosure relates to various design features of raceways and/or raceway systems that enhance the performance, control, and management of raceways systems used in shrimp production. For example, an objective of the various design features of the present invention is to maximize the recovery of shrimp molts, which have significant value in the marketplace. Another objective of the various design features is to provide enhanced disease control and water management, both of which are essential to shrimp production. Another objective is to provide features (which include any of the features described herein) capable of scouring the tidal basin structure (e.g., tidal basin floor) and/or provide laminar or smooth flow around and/or through the tidal basin. Accordingly, the design features of the present invention facilitate, among other things, rapid and efficient removal of these components from raceway systems.

In general, embodiments of the present disclosure may include at least two elongated channels, one or more recovery zones, and one or more fluid circulators. For example, a fluid (e.g., water) may circulate in a clockwise or counter-clockwise direction through a first channel to a first recovery zone, where one or more of molts, waste, fluid, and other components settle out and are collected and removed. The fluid and components (e.g., molts and/or waste) that do not settle (e.g., that are not collected and removed) may be turned and redirected to a second channel that leads to an optional second recovery zone, where, again, one or more of molts, waste, fluid, and other components settle and are collected and removed. The fluid and components that do not settle (e.g., that are not collected and removed) may either be turned and redirected back to the first channel or directed to another channel, such as an nth channel, in, for example, a serpentine configuration. One or more of the recovery zones may further include a fluid circulator located after the turn that flows the fluid in the direction of the first channel, second channel, or nth channel in a way that minimizes turbulent flow and/or promotes laminar flow.

Raceways may be provided in any of a wide array of configurations. In many embodiments, raceways may be standalone raceways and may include two or more channels in fluid communication with one or more recovery zones. For examples, raceways may include two channels and one recovery zone in fluid communication with the two channels. In embodiments in which the raceways include 3 or more channels, the channels may be provided in a serpentine configuration. Any of the raceways with two or more channels may be stacked (e.g., in fluid communication vertically) and/or connected in series and/or parallel (e.g., in fluidly coupled horizontally).

The outer boundaries of the raceways of the present disclosure are generally defined by sidewalls and end walls, wherein the sidewalls are parallel (e.g., substantially parallel) to each other and the end walls are parallel (e.g., substantially parallel) to each other. The sidewalls generally are longer in length than each of the end walls. Within the enclosure defined by the sidewalls and end walls, the raceways include at least two elongated channels oriented such that a fluid flows in a direction that is parallel to the sidewalls and further include at least one recovery zone configured to turn the fluid and permit collection and removal of shrimp molts and waste. As discussed in more detail below, each channel may be defined by a base, a sidewall, an apex, and optionally a divider. Each of the one or more recovery zones may be defined by a portion of the sidewalls, an end wall, a pit, and optionally a floor (e.g., a sloped floor). Various embodiments with combinations of these design features are discussed more fully below.

The invention of the present disclosure also relates to various design features, any of which may be used alone or in combination. The raceways of the present disclosure balance design considerations that maximize the recovery and/or removal of molts and wastes, as well as the efficiency of the system by which the molts and wastes reach and/or are collected/removed at each of the one or more recovery zones. Maximizing the recovery of molts is important in order to capture their value in the marketplace. Maximizing the removal of wastes is important in order to minimize the occurrence of disease that may harm and/or destroy a population of shrimp in the raceway. Optimizing the efficiency of the system (e.g., optimizing flow rates at which the molts and wastes reach the recovery zone) is important to control residence times in the channels. As mentioned above, molts may dissolve and/or be consumed by the shrimp if not recovered in a timely manner; and wastes may cultivate disease if not removed in a timely manner. Accordingly, the invention of the present disclosure describes embodiments that optimize the recovery and removal of molts and wastes from the raceway.

Embodiments of the present disclosure also describe raceways including a sloped base with an apex and optionally a divider extending upward from the apex. In many embodiments, the raceway includes the sloped base with the apex and the divider extending upward from the apex. The apex in combination with the divider may be used to minimize turbulent flow (e.g., promote laminar flow). The apex and divider is an improvement over conventional raceways because conventional raceways exhibit turbulent flow and/or suffer from at least one or more regions of swirling. Such turbulent flow and/or swirling is undesirable because the swirling promotes inefficient settlement of the molts, which have significant value in the marketplace, and wastes, which affect disease control and water management, in the channels, where their value may not be captured. The settlement further disrupts the water flow and water flowrate, as well as reduces the amount of molts and wastes that may be collected and removed from the raceway. By adding an apex and a divider extending therefrom, the molts and waste may steadily flow the length of the channel to the recovery zone, where the molts and waste may settle and be collected, removed, and recovered from the raceway. While many embodiments include an apex and a divider, some embodiments may only include an apex and some embodiments may only include a divider.

Embodiments of the present disclosure further describe raceways with design features that provide control over water flow and water flow rate. In many embodiments, the raceways include channels with increasing and/or decreasing cross-sectional areas. For example, in some embodiments, the apex and/or divider on the sloped base may be configured at an angle (e.g., not substantially parallel to a sidewall) to provide a channel with increasing cross-sectional area as the fluid approaches and/or enters the recovery zone. In regions of increasing cross-sectional area (e.g., proximate area of the channel entering the recovery zone), the flow rate of the fluid decreases to increase residence time and promote settlement of the molts and wastes in the recovery zone. In regions of decreasing cross-sectional area (e.g., proximate area of the channel exiting the recovery zone), the flow rate of the fluid increases to decrease residence time and to discourage settlement of the molts and wastes in the channel. Regions of decreasing cross-sectional area also may require less work or power to establish satisfactory flow after the corner and downstream therefrom. In other regions, the cross-sectional area may be constant so as to minimize/prevent turbulent flow and/or promote laminar flow.

In some embodiments, the apex and/or divider are angled in a manner such that adjacent channels increase and decrease in cross-sectional area. For example, in some embodiments, a channel entering the recovery zone may increase in cross-sectional area and a channel on the other side (i.e., the channel exiting the recovery zone) may correspondingly decrease in cross-sectional area. In other embodiments, the apex and/or divider are angled via an island such that only one of adjacent channels increase and/or decrease in cross-sectional area. For example, the channel entering the recovery zone increases in cross-sectional area and the cross-sectional area of the channel exiting the recovery zone is constant. Alternatively, the cross-sectional area of the channel entering the recovery zone is constant and the channel exiting the recovery zone decreases in cross-section area. These configurations shall not be limiting as other configurations are envisioned by the present disclosure.

Embodiments of the present disclosure further describe raceways with tapered recovery zones. Tapered recovery zones increase recovery of molts and wastes by increasing cross-sectional areas of channels and correspondingly reducing flow rates and increasing residence times. In addition, tapered recovery zones use gravity and to a lesser extent forces resulting from fluid flow to flow settling or nearly settled molts and wastes down the tapered slope and into the sump for removal and/or recovery. These and other embodiments are described in more detail below with reference to the figures.

Figure 1B:
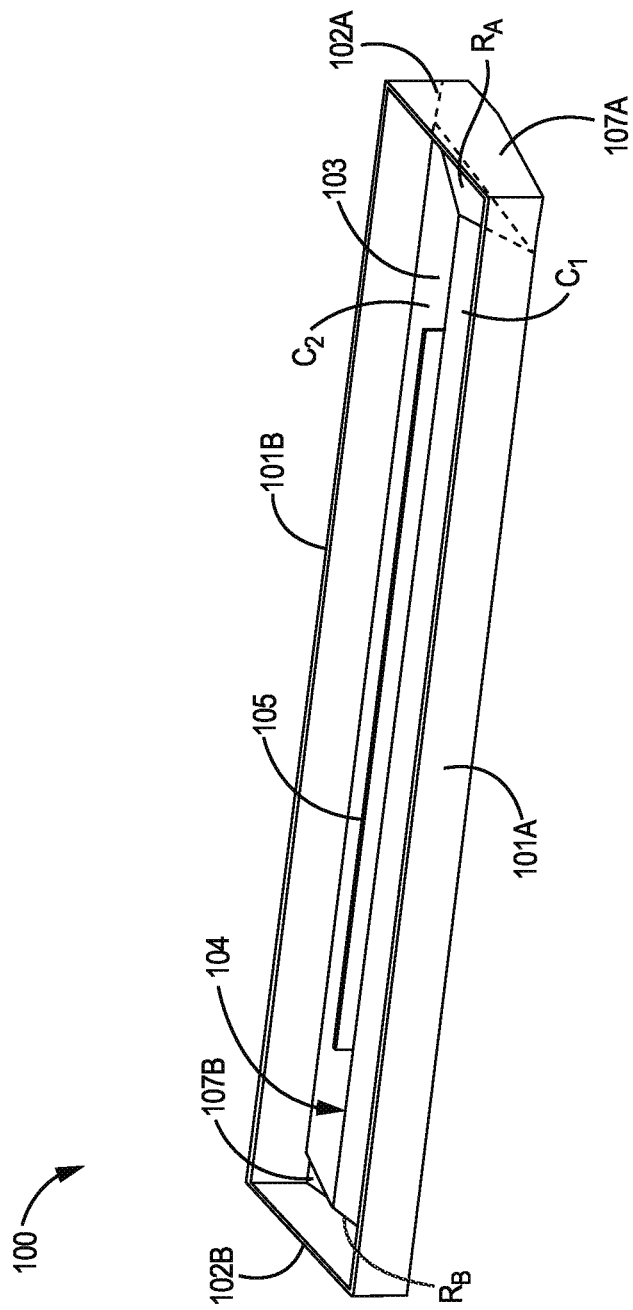
Figure 1C:
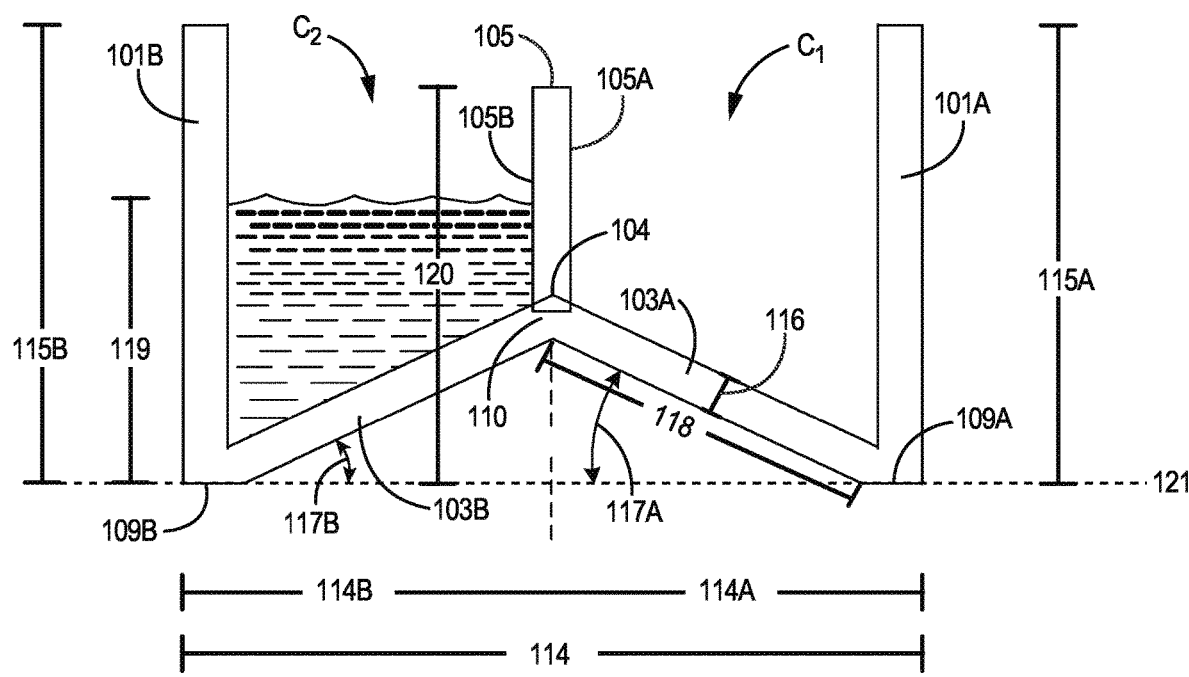
FIG. 1C is a cross-sectional view of the two elongated channels, according to one or more embodiments of the present disclosure.

FIGS. 1A and 1B are an aerial view and a perspective view of a two-channel raceway 100, respectively, according to one or more embodiments of the present disclosure. The raceway 100 may include at least two channels and one or more recovery zones. As shown in FIGS. 1B and 1C, in some embodiments, the raceway includes two elongated channels, $C_1$ and $C_2$, and two recovery zones, $R_A$ and $R_B$, in fluid communication with each other. In a preferred embodiment (not shown), the raceway includes one recovery zone. As shown in FIGS. 1A and 1B, fluid may flow through a first elongated channel $C_1$ to a first recovery zone $R_A$, then flow from the first recovery zone $R_A$ to the second elongated channel $C_2$, and further flow from the second elongated channel $C_2$ back to the first recovery zone $R_A$, where the fluid flow repeats. The direction of flow may proceed in a clockwise or counterclockwise direction. Additional fluid may be introduced at any of the first or second recovery zones $R_A$, $R_B$ and components from the fluid (e.g., waste, molts, fluid, etc.) may be recovered and removed from any of the first or second recovery zones. However, these shall not be limiting as additional fluid may be introduced at any part of the raceway and components from the fluid may be recovered and removed from any part of the raceway. While in many embodiments, the recovery zone is in fluid communication with two channels, in other embodiments, the recovery zone may be in fluid communication with one or more channels.

As shown in FIGS. 1A and 1B, the outer boundaries of the raceway 100 may be defined by sidewalls 101A and 101B and end walls 102A and 102B. In general, the sidewalls 101A and 101B may be separated by a sloped base 103 with an apex 104 and an optional divider 105 extending upward from the apex. In addition, the sidewalls 101A and 101B are generally oriented such that they oppose and/or are parallel to the apex 104 and/or optional divider 105. The end walls 102A and 102B are generally oriented perpendicular to sidewalls 101A and 101B and mechanically coupled thereto via a junction, for example. The sloped base 103 may fully extend to the end walls 102A and 102B or may not fully extend to the end walls 102A and 102B. In embodiments where the sloped base does not fully extend to the end walls 102A and 102B, a sloped floor may extend from an end of the sloped base 103 to one of the end walls 102A and 102B. In other embodiments where the sloped base does not fully extend to the end walls 102A and 102B, the sloped floor may extend from the sloped base 103 to a pit 107A and 107B and the pit 107A or 107B may extend to the end walls 102A or 102B.

Each of the two channels $C_1$ and $C_2$ may be defined by a portion of the sloped base 103 and vertical barriers oriented longitudinally including one of the side walls 101A and 101B and the apex 104. In many embodiments, each of the two channels $C_1$ and $C_2$ includes the optional divider 105 extending upward from the apex 104. In these embodiments, each of the channels $C_1$ and $C_2$ may be further defined by the divider 105. The first channel $C_1$ may be defined a portion of the sloped base 103 (e.g., on one side of the apex) and vertical barriers oriented longitudinally that include side wall 101A and the apex 104 with a side of the divider 105A extending upward from the apex 104. The sloped base 103 may separate the sidewall 101A from the apex 104 and the side of the divider 105A. Similarly, the second channel $C_2$ may be defined by the other portion of the sloped base 103 (on an opposing side of the apex) and vertical barriers oriented longitudinally that include side wall 101B and the apex 104 with a side of the divider 105B extending upward from the apex 104. The sloped base 103 may separate the sidewall 101B from the apex 104 and the side of the divider 105B.

Each of the two recovery zones $R_A$ and $R_B$ may be defined by one or more of at least a portion of sidewalls 101A and 101B, end walls 102A and 102B, sloped floors (if included), and a pit 107A and 107B (if included). In many embodiments, the recovery zones include the optional pit 107A and 107B. In these embodiments, each of the recovery zones may be further defined by the pit 107A or 107B. For example, embodiments may include a first recovery zone and a second recovery zone. Also see recovery zones described below under FIGS. 2A-2C.

FIG. 1C is a cross-sectional view of the two elongated channels $C_1$ and $C_2$, according to one or more embodiments of the present disclosure. The cross-sectional view of the two elongated channels shown in FIG. 1C includes the two sidewalls 101A and 101B, sloped base 103 with the apex 104, and the optional divider 105 extending upward from the apex 104. Channel $C_1$ is formed from sloped base 103A enclosed by sidewall 101A and one or more of apex 104 and/or divider 105 (e.g., a side of divider 105A). Sloped base 103A is coupled to sidewall 101A via sidewall junction 109A and to apex 104 in embodiments without optional divider 105. Alternatively, sloped base 103A is coupled to sideway 101A via junction 109A and to apex 104 and divider 105 via divider junction 110 in embodiments with the optional divider. Channel $C_2$ is formed from sloped base 103B enclosed by sidewall 101B and one or more of apex 104 and divider 105 (e.g., a side of divider 105B). Sloped base 103B is coupled to sidewall 101B via sidewall junction 109B and to apex 104 in embodiments without optional divider 105. Alternatively, sloped base 103b is coupled to sidewall 101B via junction 109B and to apex 104 and divider 105 via divider junction 110.

A width 114 of the raceway may span from junction 109A to junction 109B. The width 114 of the raceway may include widths 114A and 114B. For example, widths 114A and 114B may be the same or different. In many embodiments, widths 114A and 114B are the same. In other embodiments, widths 114A and 114B are different. The sidewalls 101A and 101B may be characterized by a height 115. The height 115A of sidewall 101A and the height 115B of sidewall 101B may be the same or different. In many embodiments, the height 115A of sidewall 101A and the height 115B of sidewall 101B are the same. In other embodiments, the height 115A of sidewall 101A and the height 115B of sidewall 101B are different.

The sloped base 103 may comprise a single panel or two panels that join at the apex 104. A thickness 116 of the sloped base 103 may range from about 5 mm to about 400 mm. In many embodiments, the thickness 116 of the sloped base 103 is the same. In other embodiments, the thickness 116 of the sloped base 103 may vary along the horizontal axis. Sloped base 103A and 103B may be defined by one or more of the width 114A and 114B of the raceway, an angle 117A and 117B of the sloped base 103A and 103B relative to the horizontal axis, and a width 118A and 118B of the sloped base 103A and 103B. The angle 117A and 117B of the sloped base 103 relative to the horizontal axis may range from about 0 degrees to less than 90 degrees. The width 118A and 118B of the sloped base 103A and 103B, respectively, may range from about 100 mm to about 1 m. In some embodiments, the angles 117A and 117B are the same. In other embodiments, the angles 117A and 117B are different. In many embodiments, the angles 117A and 117B range from about 1 degrees to about 20 degrees. In a preferred embodiment, the angles 117A and 117B range from about 5 degrees to about 15 degrees. In a more preferred embodiment, the angles 117A and 117B range from about 6 degrees to about 8 degrees. The dimensions and angles of the sloped base 103 may be selected such that the apex 104 is at a desired height above the horizontal axis. In addition, one or more of widths 114A, 114B, 118A, and 118B, and angles 117A and 117B may be selected according to a desired channel depth 119. For example, in embodiments including an apex 104 without a divider 105, the dimensions of the channels and, in general, the raceway may be selected such that the fluid level during operation is below the apex 104. In embodiments including an apex 104 and a divider 105, the dimensions of the channels and, in general, the raceway may be selected such that the fluid level during operation is below the divider 105. In other embodiments, the raceway, either without or with an apex, may be selected such that the fluid level is above the apex and/or above the divider, if present. In this way, the dimensions are selected to promote and/or observe laminar flow and/or minimize turbulent flow.

A height 120 of the apex 104 may be used to define a maximum height of the apex relative to a horizontal axis 121. The height 120 of the apex 104 may be a function of a width of the sloped base 103A and/or 103B and an angle 117A and 117B of the sloped base 103A and/or 103B. In addition, one or more of the height 115 of the side wall 101, width of the sloped base 118A and/or 118B, and angle of the sloped base 117A and/or 117B may be selected so a peak of the apex is above or below the side walls 101A and/or 101B. In many embodiments, the peak of the apex is below the side walls 101A and 101B. In other embodiments, the peak of the apex is above the side walls 101A and 101B.

While the above discussion includes examples of dimensions and materials, including material construction, and various configurations, these examples shall not be limiting. Any dimensions, materials, and configurations may be used to achieve any of the objectives described herein. For example, the objectives may include, but are not limited to, maximize performance, operation, and construction of the raceways. These are design considerations that one of skill in the art may select and incorporate into any of the embodiments described herein.

Figure 1D:
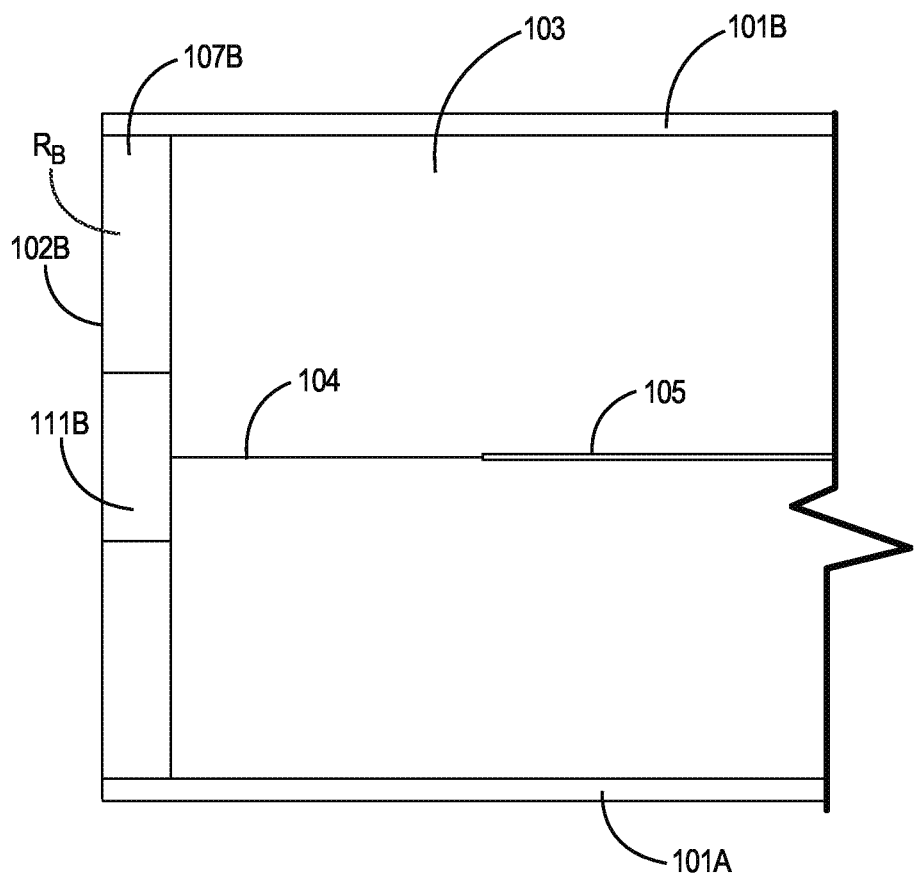
FIGS. 1D and 1E shows an aerial and a perspective view of a recovery zone, respectively, according to one or more embodiments of the present disclosure.
Figure 1E:
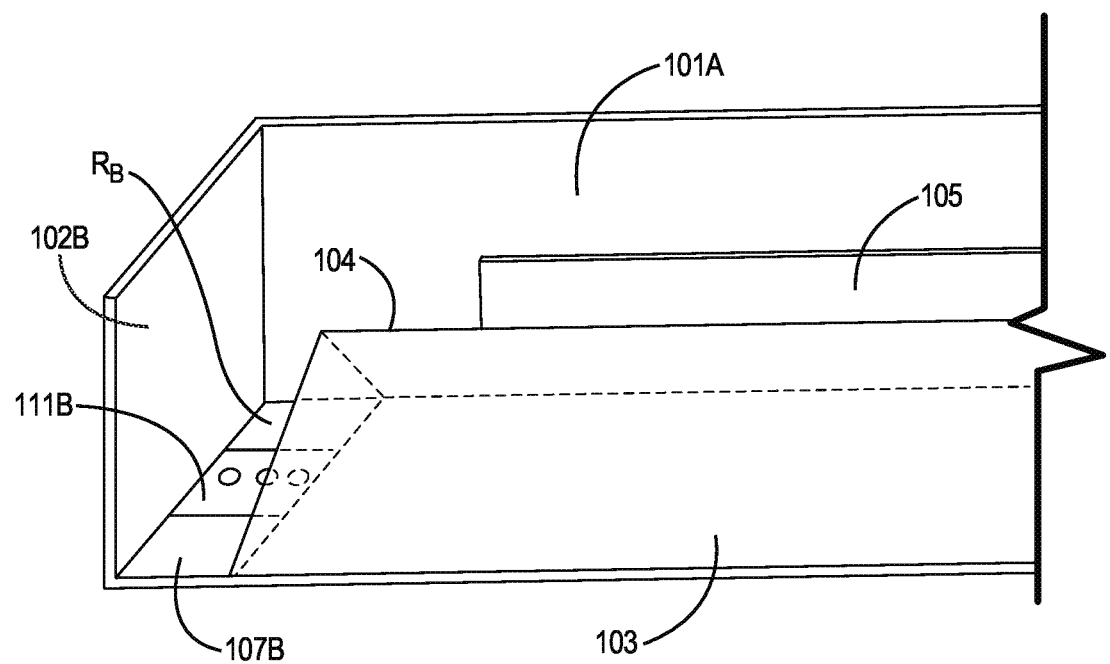

FIGS. 1D and 1E shows an aerial and perspective view of a recovery zone, respectively, according to one or more embodiments of the present disclosure. A first recovery zone (not shown) may be defined by at least a portion of sidewalls 101A and 101B, end wall 102A, and pit 107A, which may include a collection zone. As shown in FIG. 1D, the second recovery zone $R_B$ may be defined by at least a portion of sidewalls 101A and 101B, end wall 102B, and pit 107B, which may include a collection zone 111B. In some embodiments, one or more recovery zones may further be defined by one or more inlets and/or one or more pumps. For example, in some embodiments, one or more of the first and second recovery zones may include an inlet (not shown). In general, a first inlet is a portion of end wall 102A where, for example, a first pump (not shown) may supply a fluid (e.g., water and/or shrimp) to the raceway. While the first inlet and pump are optional, in embodiments where the inlet 112A and pump are included in a recovery zone, the fluid may be introduced via the first inlet after the fluid direction changes such that the supplied fluid is directed downstream, minimizing turbulent flow, such as swirling. That is, the first inlet and/or pump may be provided in-line with an outlet channel, which is generally after the turn. The opposing second recovery zone $R_B$ may similarly include an optional second inlet and second pump, with the same or similar configurations to the first recovery zone. In other embodiments, one or more inlets and/or one or more pumps may be provided in areas other than a recovery zone.

Pit 107 may include collection zone 111. In general, collection zone 111 is an area of pit 107 wherein desired components settle out of the fluid and/or desired components are collected and removed from the fluid and/or exit the raceway system. In some embodiments, desired components are separated from undesired components via a filter and/or screen. The collection zone 111 may comprise a portion of pit 107, such as collection zone 111B, and desired components may be collected and removed via one or more of openings in the collection zone through which the desired components may exit and be removed/recovered. The collection zone may comprise any shape, such as a rectangular shape, circular shape, square shape, etc. In embodiments where the collection zones comprise a portion of pit 107, the collection zone may be provided at any location of pit 107A and 107B, respectively. In other embodiments, the collection zone 111 and pit 107 may be the same. That is, in these embodiments, the collection zone 111 may entirely comprise and function as pit 107 in addition to functioning as a collection zone. In some embodiments, no collection zone is provided in pit 107.

Figure 2A:
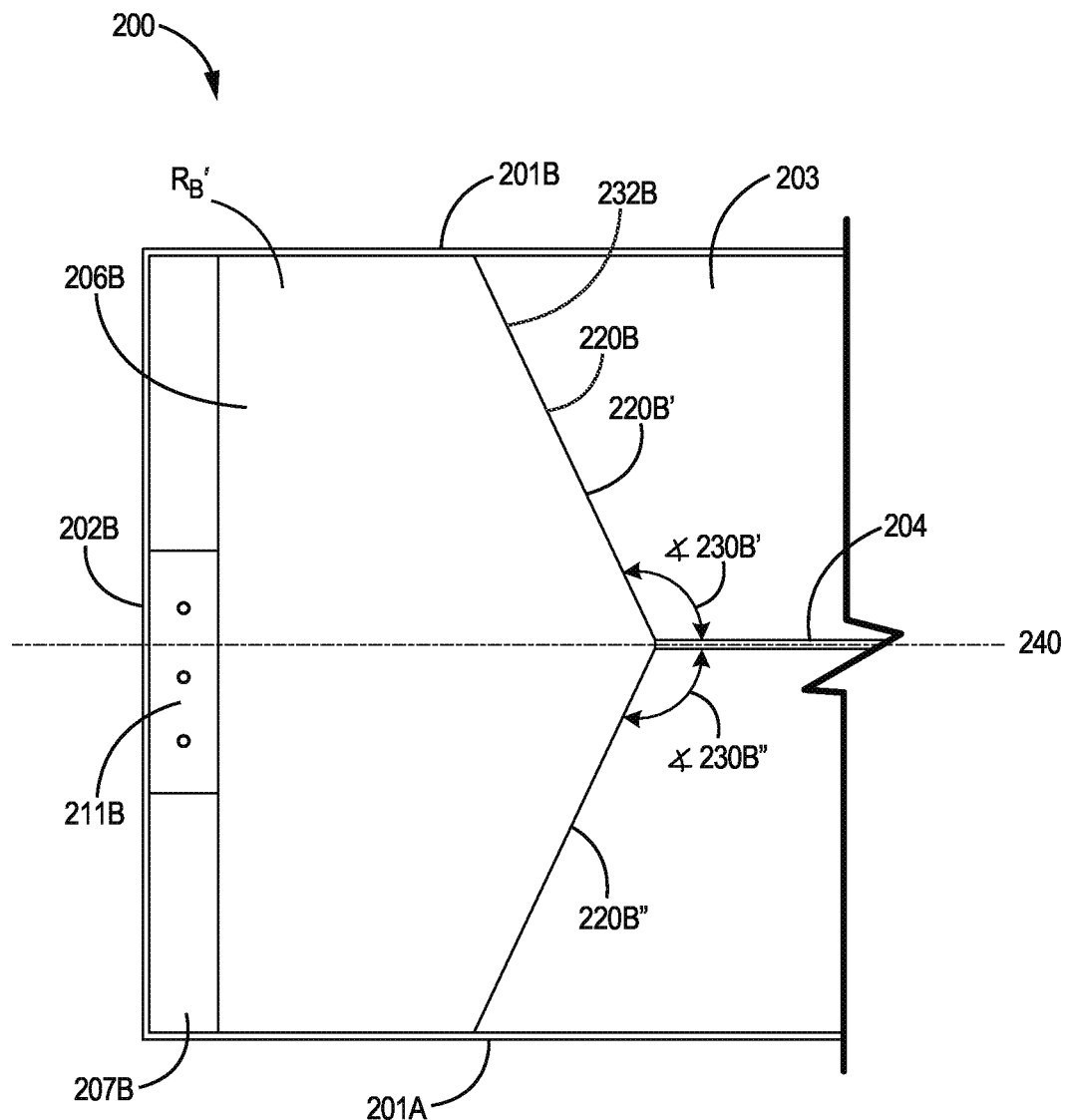
FIGS. 2A and 2B shown an aerial view and a perspective view, respectively, of a recovery zone with tapered ends, according to one or more embodiments of the present disclosure.
Figure 2B:
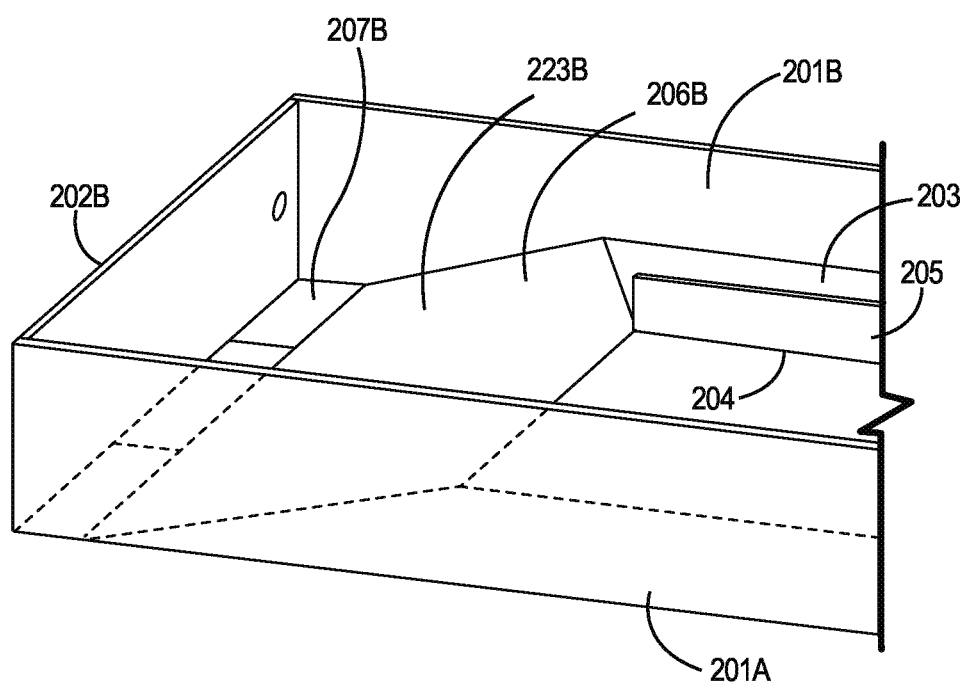

FIGS. 2A and 2B show an aerial view and a perspective view, respectively, of a portion of a raceway 200 having a recovery zone with tapered ends, according to one or more embodiments of the present disclosure. Recovery zones may include tapered ends to increase a cross-sectional area of the channel at a certain proximal distance from the recovery zone to encourage settling therein. For example, in a two-channel raceway system, optional first recovery zone and second recovery zone $R_B'$ may be located at or near opposite ends of the raceway 200 (only second recovery zone $R_B'$ is shown in FIG. 2A; the first recovery zone is optional and not shown). As shown in FIG. 2A, recovery zone $R_B'$ may be defined by at least a portion of sidewalls 201A and 201B, end wall 202B, sloped floor 206B, and pit 207B, which may include collection zone 211B. Sloped floor 206B may be coupled to sloped base 203 via junction 220B. Junction 220B may be provided at an angle relative to horizontal axis 240, as described further below. The sloped floor 206B is part of a tapered end 223B (or tapered zone 223B) to increase the cross-sectional area of the channel. In those embodiments in which the raceway has two recovery zones, the first recovery zone can be configured similar to the second recovery zone $R_B'$.

The sloped floor 206B may include a symmetric or an asymmetric configuration. An asymmetric configuration permits tuning of cross-sectional areas of the inlet and outlet channels and may provide greater control over inlet and outlet flow rates to encourage settling. In a symmetric configuration, as shown in FIG. 2B, the junction 220 and angle 230 are mirror images across the horizontal axis 240. The junction 220B includes junction 220B' and angle 230B' above the horizontal axis 240, as well as junction 220B" and angle 230B" below the horizontal axis 240. In symmetric configurations, angles 230B' and 230B" are equal; in asymmetric configurations, angles 230B' and 230B" are different. In both symmetric and asymmetric configurations, angles 230B' and 230B" may range from about zero to about 180 degrees. In many embodiments, angles 230B' and 230B" range from about 45 degrees to about 180 degrees. In preferred embodiments, angles 230B' and 230B" are about 135 degrees. A sloped floor on an opposite end of the raceway 200, relative to end wall 202B, can be configured similarly to the sloped floor 206B of FIGS. 2A and 2B and can be part of a second tapered end (or second tapered zone), similar to the tapered end 223B. The second tapered end can be part of a second recovery zone or the second tapered end can be part of a raceway without a second recovery zone.

Figure 2C:
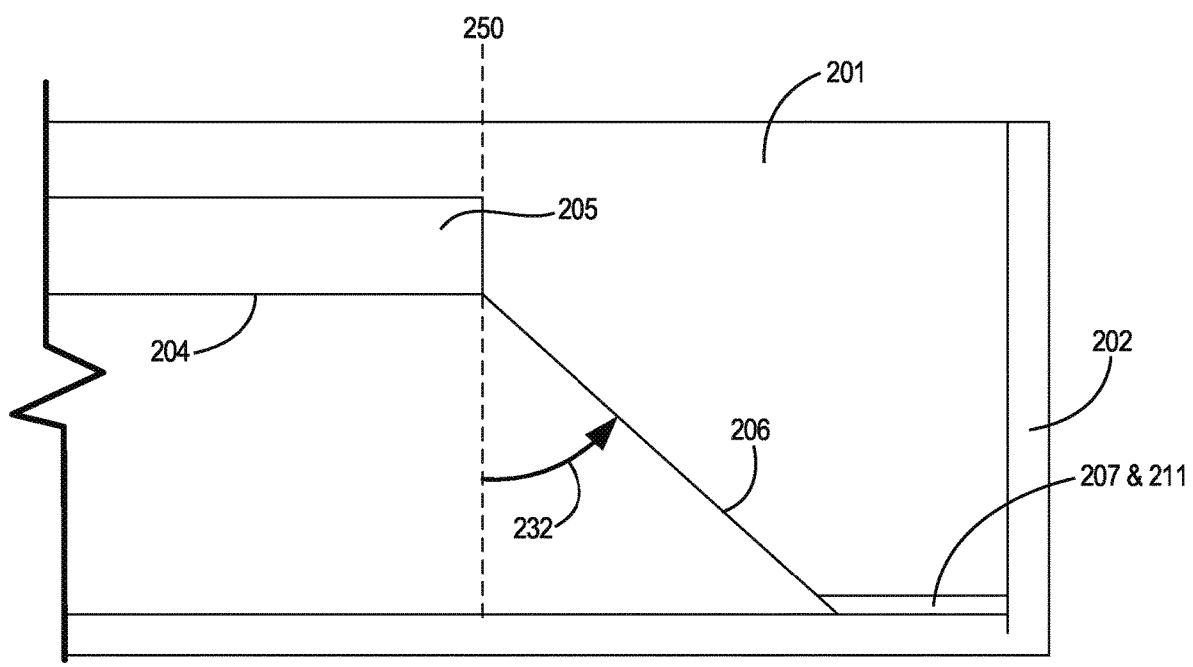
FIG. 2C is a cross-sectional view of a recovery zone, according to one or more embodiments of the present disclosure.

FIG. 2C is a cross-sectional view of a recovery zone, according to one or more embodiments of the present disclosure. As shown in FIG. 2C, the recovery zone may include an apex 204 with an optional divider 205 and may be enclosed by sidewalls 201 and end wall 202. Sloped floor 206 may extend from one or more of the apex 204 and divider 205 to a pit 207, which may include a collection zone 211. The sloped floor 206 gradually slopes downward to one or more of the end wall 202 or, as shown in FIG. 2C, to the pit 207. The gradual slope downward may increase a cross-sectional area of the inlet channel and of the recovery zone. As the cross-sectional area of the inlet channel and recovery zone increases, the flow rate of the fluid decreases, encouraging settling. The slope of sloped floor 206 may be characterized by an angle 232 relative to a vertical axis 250. In many embodiments, the angle 232 may range from about 0 degrees to about 90 degrees. In other embodiments, the angle 232 may be greater than about 90 degrees. The angle 232 may be selected according to desired settling rates and/or flow rates, among other things.

The apex and/or optional divider may be provided at an angle along the length of the channel such that one or more channels include expansion regions, contraction regions, and non-expansion regions. Expansion regions refer to regions where the cross-sectional area increases such that the flowrate decreases relative to non-expansion regions and contraction regions. Expansion regions promote and/or facilitate settling of desired components. Contraction regions refer to regions where the cross-sectional area decreases such that the flowrate increases relative to non-expansion regions and expansion regions. Contraction regions are provided to avoid settlement and/or reduce the likelihood of settlement in the channel at undesirable areas. Non-expansion regions are generally areas of the channel in which the sidewall and apex including the optional divider if present are parallel such that the cross-sectional area is constant. One or more of an expansion region, contraction region, and non-expansion region may be provided in each channel to provide a variety of embodiments within the scope of the present disclosure.

Configurations may include symmetric configurations, wherein the expansion regions and/or contracting regions of adjacent channels at opposing ends of the raceway have equal angles (e.g., relative to a horizontal axis). For example, in some embodiments, the angles and/or cross-sectional area of the expansion region and/or contraction region may be the same at opposing ends of the raceway. Configurations may also include asymmetric configurations, wherein the angles and/or cross-sectional areas are the expansion regions and/or contracting regions of adjacent channels at opposing ends of the raceway have non-equal angles (e.g., relative to a horizontal axis). For example, in some embodiments, the angles and/or cross-sectional area of the expansion region and/or contraction region may be different at opposing ends of the raceway.

Figure 3A:
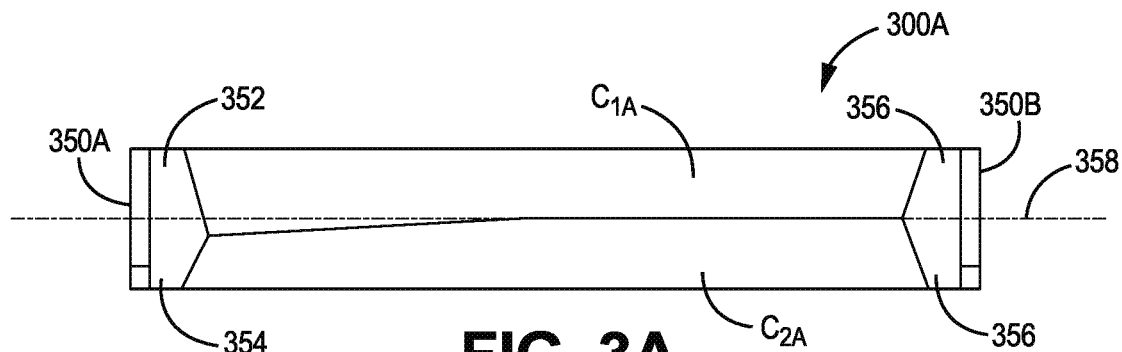
FIGS. 3A to 3D show various configurations of a two-channel raceway 300 with angled channels, according to one or more embodiments of the present disclosure.
Figure 3B:
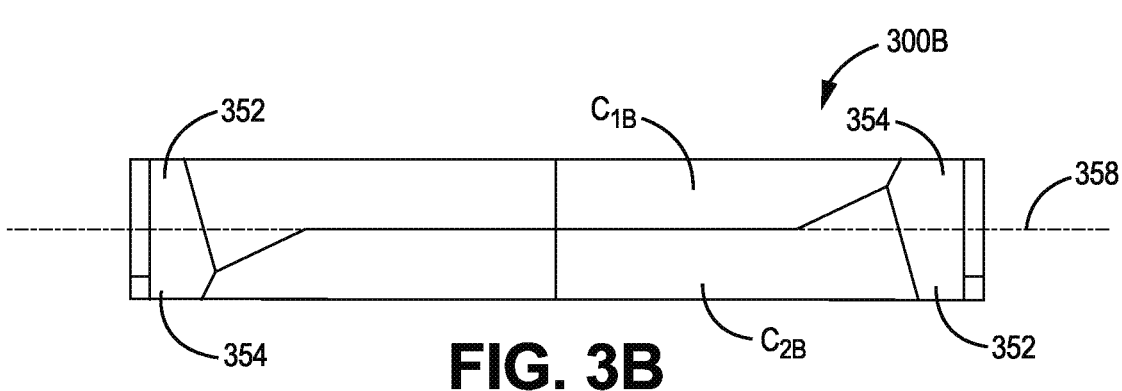

FIGS. 3A to 3D, for example, show various configurations of a two-channel raceway 300 with angled channels, according to one or more embodiments of the present disclosure. While raceways may include one or more recovery zones, the raceways may preferably include only one recovery zone. FIG. 3A shows an asymmetric two-channel raceway 300A, wherein one longitudinal end 350A of the raceway includes a change in cross-sectional area of the channel. In particular, FIG. 3A shows a two-channel raceway wherein one longitudinal end 350A includes an expansion region 352 in a first channel $C_{1A}$ and a contraction region 354 in a second channel $C_{2A}$ and an opposing longitudinal end 350B without change in cross-sectional area of the channel. In other words, the longitudinal end 350B includes a non-expansion region 356 in each of channels $C_{1A}$ and $C_{2A}$. FIG. 3B shows a symmetric two-channel raceway 300B, wherein each of the two channels $C_{1B}$ and $C_{2B}$ includes an expansion region 352 and a contraction region 354 and the corresponding expansion regions and contraction regions of the two channels $C_{1B}$ and $C_{2B}$ have the same cross-sectional area and/or angle relative to a horizontal axis line 358 along the length of the channels $C_{1B}$ and $C_{2B}$.

Figure 3C:
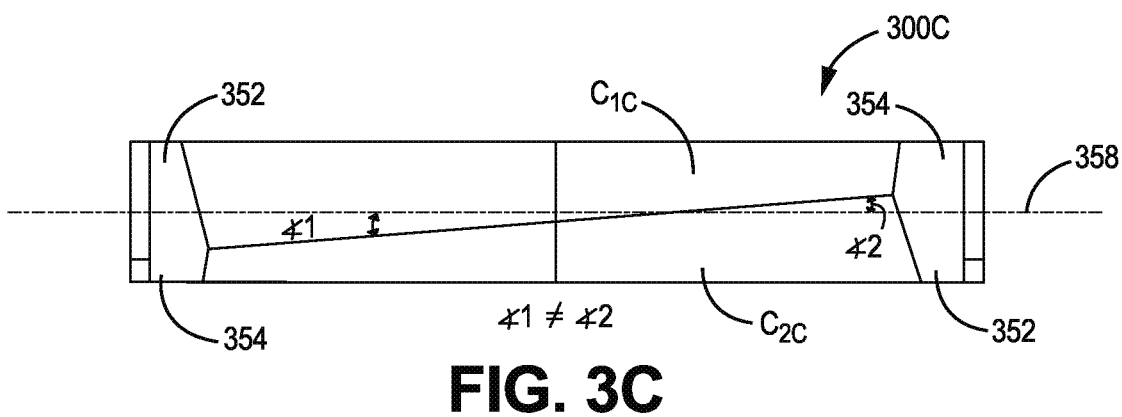
Figure 3D:
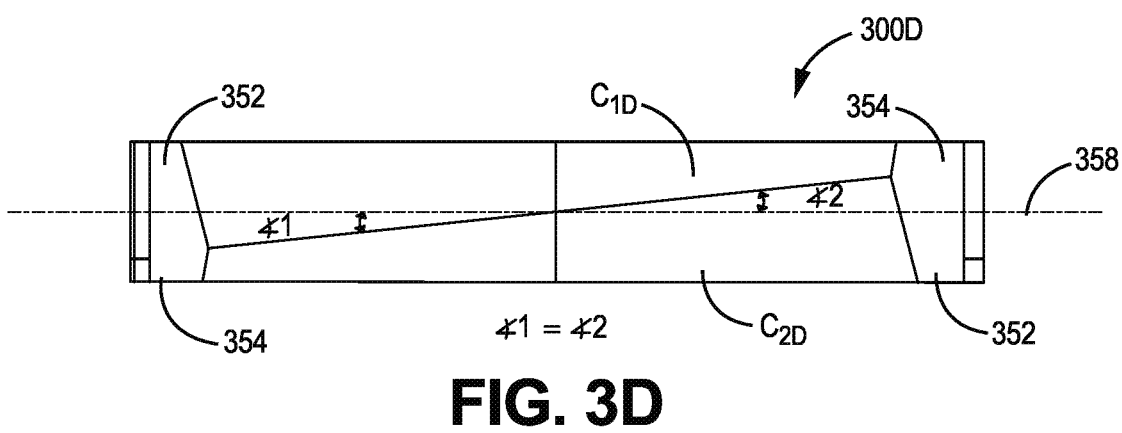

In each of the embodiments shown in FIGS. 3C and 3D, none of the channels include a non-expansion region. FIG. 3C shows an asymmetric two-channel raceway 300C, wherein the corresponding expansion regions 352 of each of the two channels $C_{1C}$ and $C_{2C}$ have different cross-sectional areas and/or angles relative to a horizontal axis line 358 along the length of the channels $C_{1C}$ and $C_{2C}$ and wherein the corresponding contraction regions 354 of each of the two channels $C_{1C}$ and $C_{2C}$ similarly have different cross-sectional areas and/or angles relative to a horizontal axis line 358 along the length of the channels $C_{1C}$ and $C_{2C}$. FIG. 3D shows a symmetric two-channel raceway 300D, wherein each of the two channels $C_{1D}$ and $C_{2D}$ includes an expansion region 352 and a contraction region 354 and the corresponding expansion regions and contraction regions of the two channels $C_{1D}$ and $C_{2D}$ have the same cross-sectional area and/or angle relative to a horizontal axis line 358 along the length of the channels $C_{1D}$ and $C_{2D}$. While the length of the optional divider is shown to be less than the length of the apex in FIGS. 3A-3D, in other embodiments, the length of the optional divider may be the same as the length of the apex.

Figure 4A:
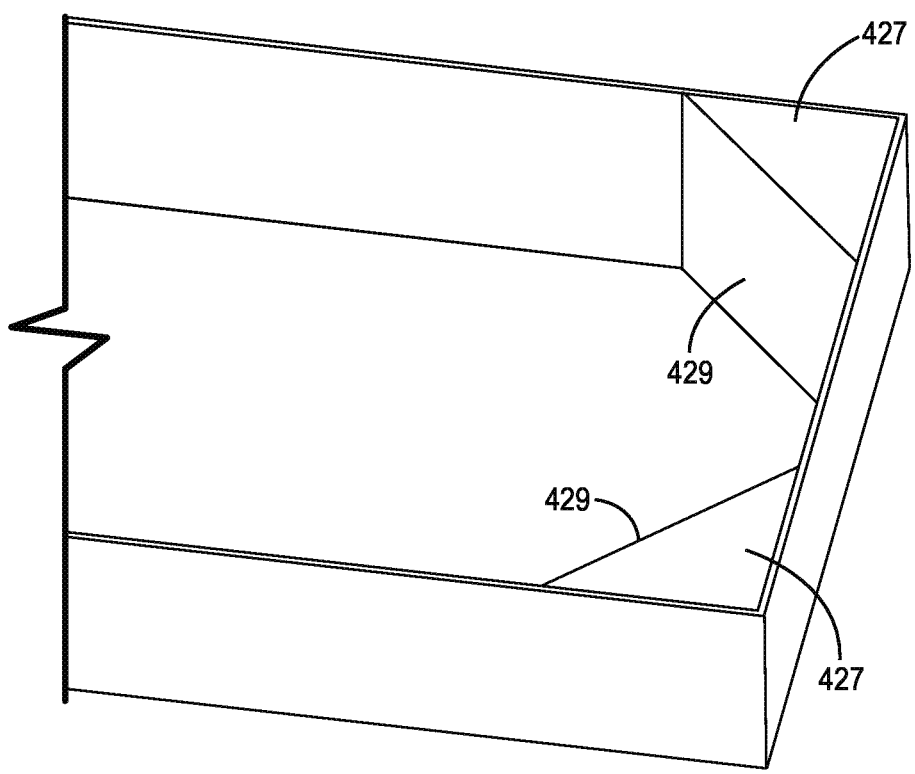
FIGS. 4A-4C are perspective views of raceway systems showing corner inserts, according to one or more embodiments of the present disclosure.
Figure 4B:
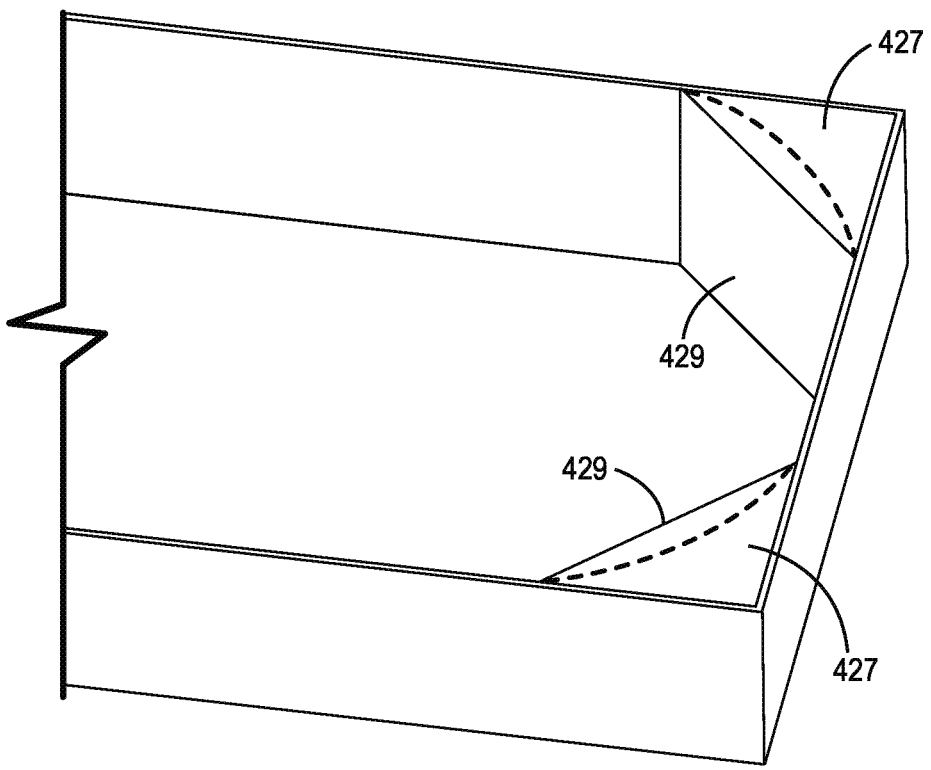
Figure 4C:
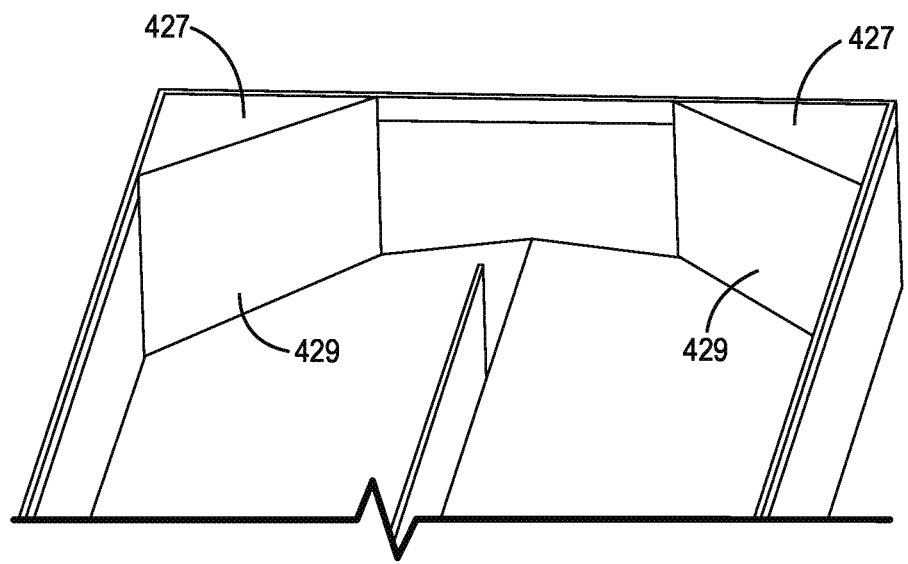

Corner inserts may be included in one or more recovery zones or one or more corners to increase a fluid flow rate by decreasing a cross-sectional area of one or more of the inlet channel, outlet channel, and recovery zone. In some embodiments, recovery zones with one or more corner inserts do not include components (e.g., pits, collection zone, etc.) for removing waste, molts, etc. In many embodiments, corner inserts are included in raceways systems where a minimum flowrate must be maintained when turning the corner to keep waste and molts from settling in an area from which the waste and molts cannot be easily collected. This may be common, for example, in smaller raceways where only one sump and/or pump are needed. The corner inserts may include any shape. The corner inserts may include surfaces in contact one or more of the sidewall, end wall, sloped base, sloped floor, and pit and may include another surface in contact with the fluid. The former may be shaped based on the shape of the corner and the latter may be provided in any shape. For a non-limiting example, see FIGS. 4A-4C, which are perspective views of raceway systems showing corner inserts 427, according to one or more embodiments of the present disclosure. As shown in FIGS. 4A-4C, a shape of the surface 429 (of the insert 427) in contact with the fluid may be rounded and/or straight, respectively.

Figure 5:
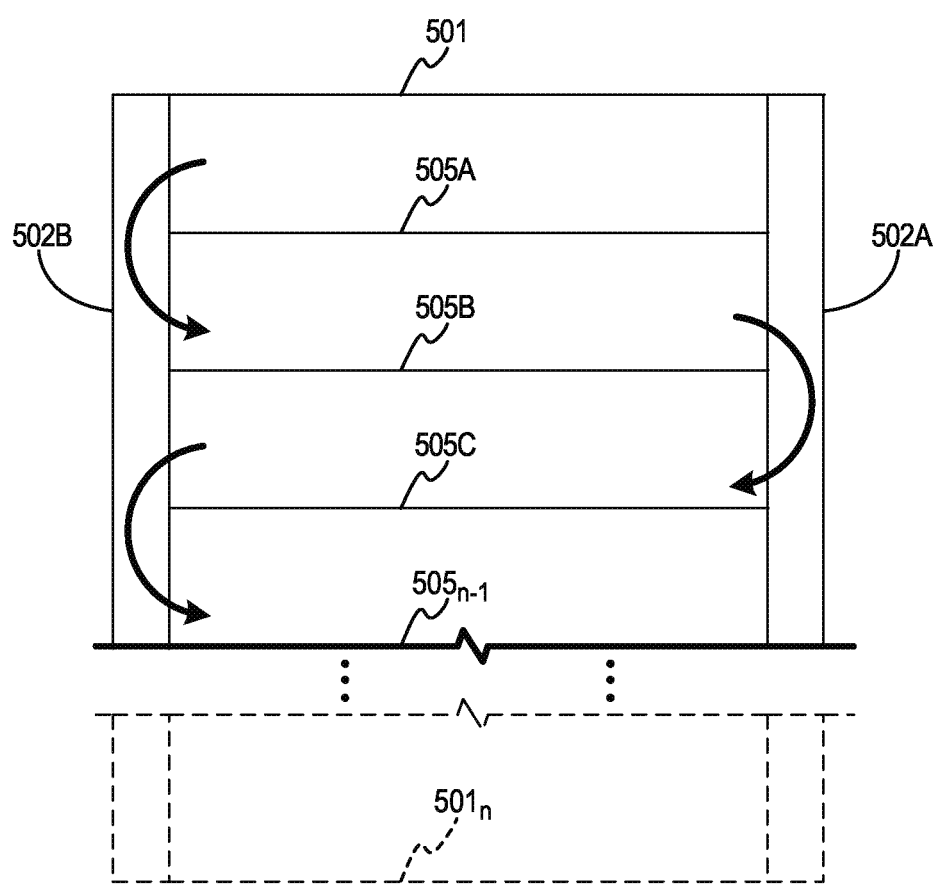
FIG. 5 is a schematic diagram of an aerial view of an nth-channel raceway with a serpentine configuration, according to one or more embodiments of the present disclosure.

FIG. 5 is a schematic diagram of an aerial view of an nth-channel raceway with a serpentine configuration, according to one or more embodiments of the present disclosure. As shown in FIG. 5, the raceway includes sidewalls 501A and 501n separated by an apex and/or divider (e.g., including 505A, 505B, 505C, 505D, and 505n-1) and end walls 502A and 502B. Sidewall 501A and each of apex and/or dividers 505A to 505n-1 may form a channel. For example, sidewall 501A and 505A may form a channel; sidewall 505A and 505B may form a channel, and so on. The n represents the number of apex or dividers, which may be selected based on any design consideration, such as, width and/or length. The raceway may include any of the recovery zones in fluid communication with one or more of the channels. In a serpentine configuration, at each recovery zone, the direction of flow is not directed back to a previous channel, but rather, for example, directed to the next channel in a serpentine configuration. These configurations shall not be limiting as any configuration known in the art may be used for the raceways of the present disclosure.

Figure 6:
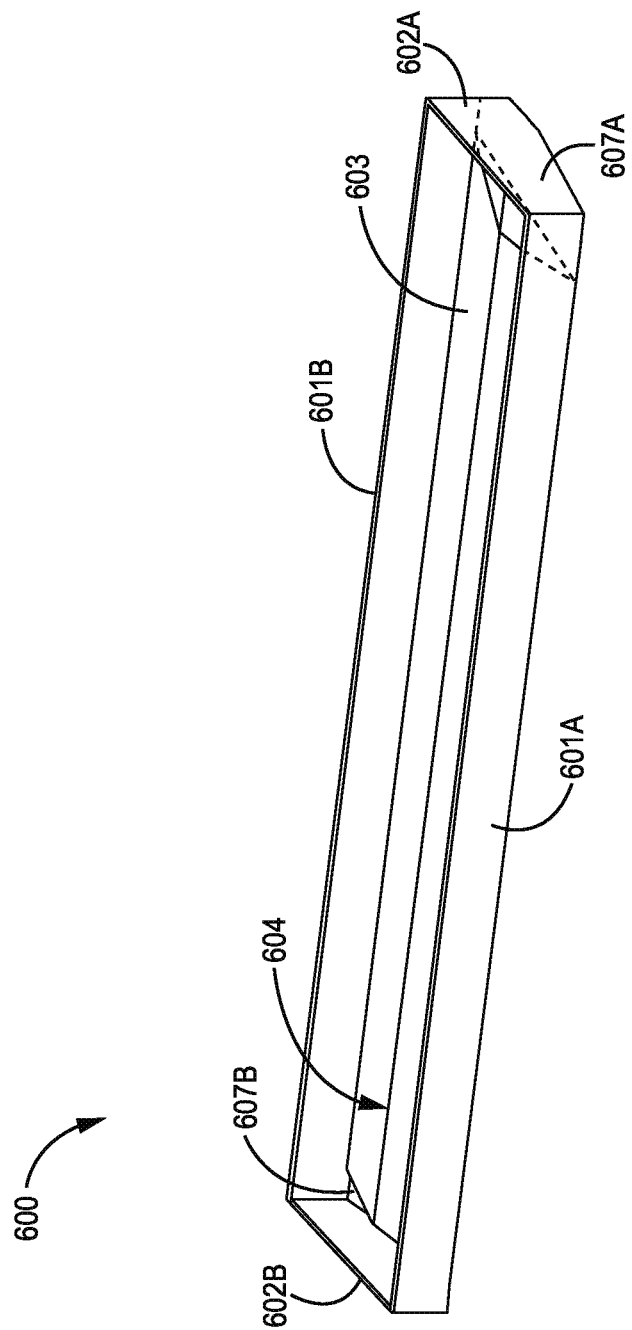
FIG. 6 is a schematic diagram of a raceway with an apex and recovery zones, according to one or more embodiments of the present disclosure.
Figure 7:
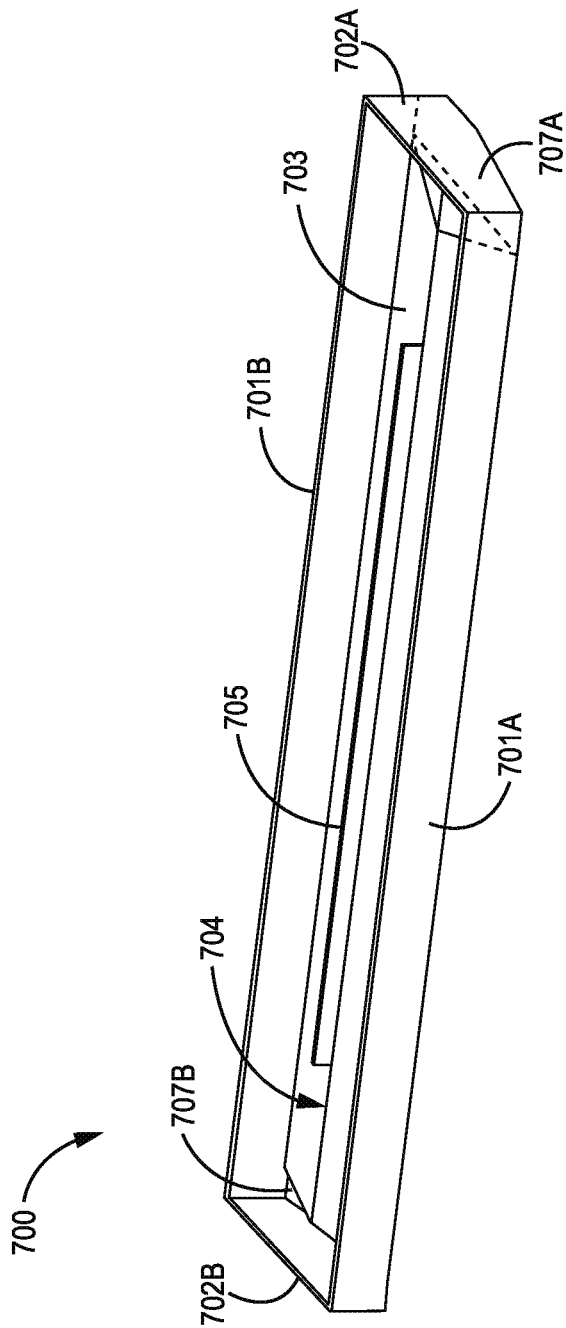
FIG. 7 is a schematic diagram of a raceway with an apex and a divider extending upward from the apex and recovery zones, according to one or more embodiments of the present disclosure.
Figure 8:
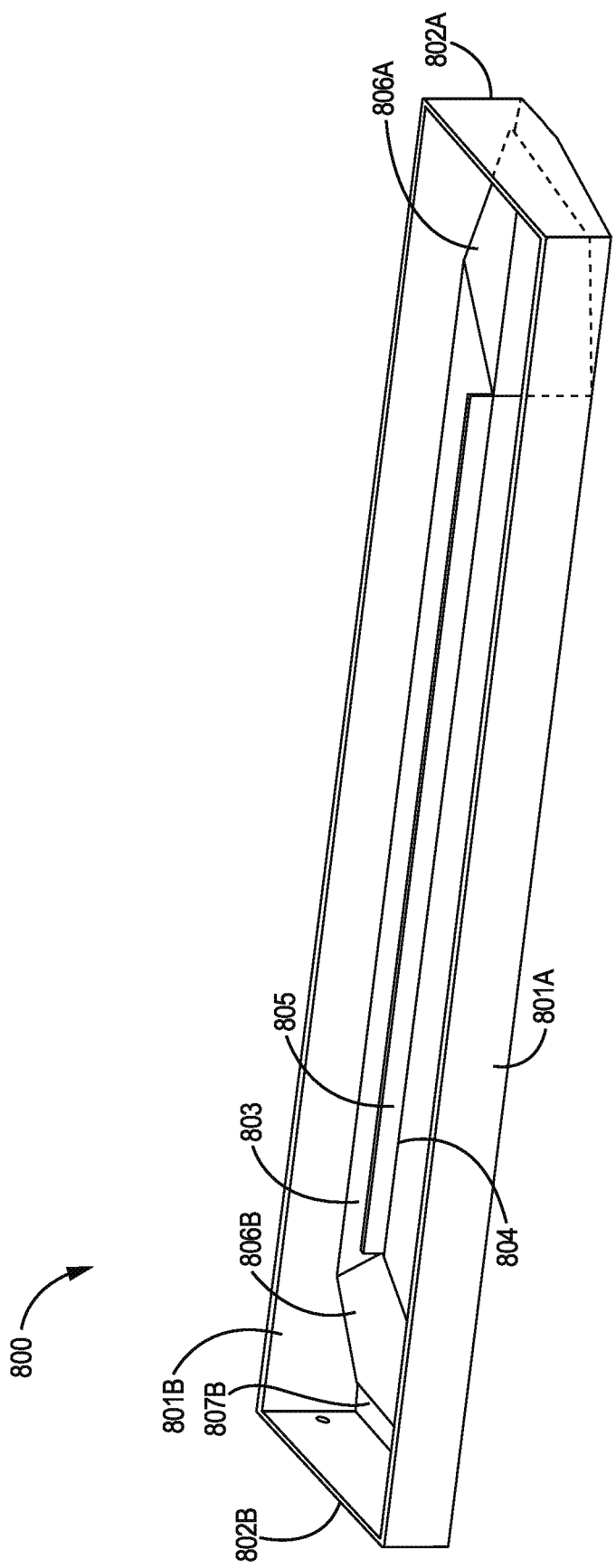
FIG. 8 is a schematic diagram of a raceway with an apex and a divider extending upward from the apex and recovery zones with a sloped floor, according to one or more embodiments of the present disclosure.

FIGS. 6 to 9 are schematic diagrams of various non-limiting embodiments of the raceways of the present disclosure. FIG. 6 is a schematic diagram of a raceway 600 with an apex 604 and recovery zones, according to one or more embodiments of the present disclosure. The raceway 600 includes sidewalls 601A, 601B, end walls 602A, 602B, sloped base 603, and pit 607A, 607B. As shown in FIG. 6, the apex 604 does not include the optional divider and the recovery zones do not include a sloped floor. FIG. 7 is a schematic diagram of a raceway 700 with an apex 704 and a divider 705 extending upward from the apex 704 and recovery zones, according to one or more embodiments of the present disclosure. The raceway 700 also includes sidewalls 701A, 701B, end walls 702A, 702B, sloped base 703 and pit 707A, 707B. As shown in FIG. 7, the recovery zones of the raceway 700 do not include a sloped floor. FIG. 8 is a schematic diagram of a raceway 800 with sidewalls 801A, 801B, end walls 802A, 802B, an apex 804, a divider 805 extending upward from the apex 804 and a recovery zone with a sloped floor 806B and pit 807B, according to one or more embodiments of the present disclosure. The raceway 800 also includes a sloped floor 806A at an opposite end of the raceway by the end wall 802A.

Figure 9:
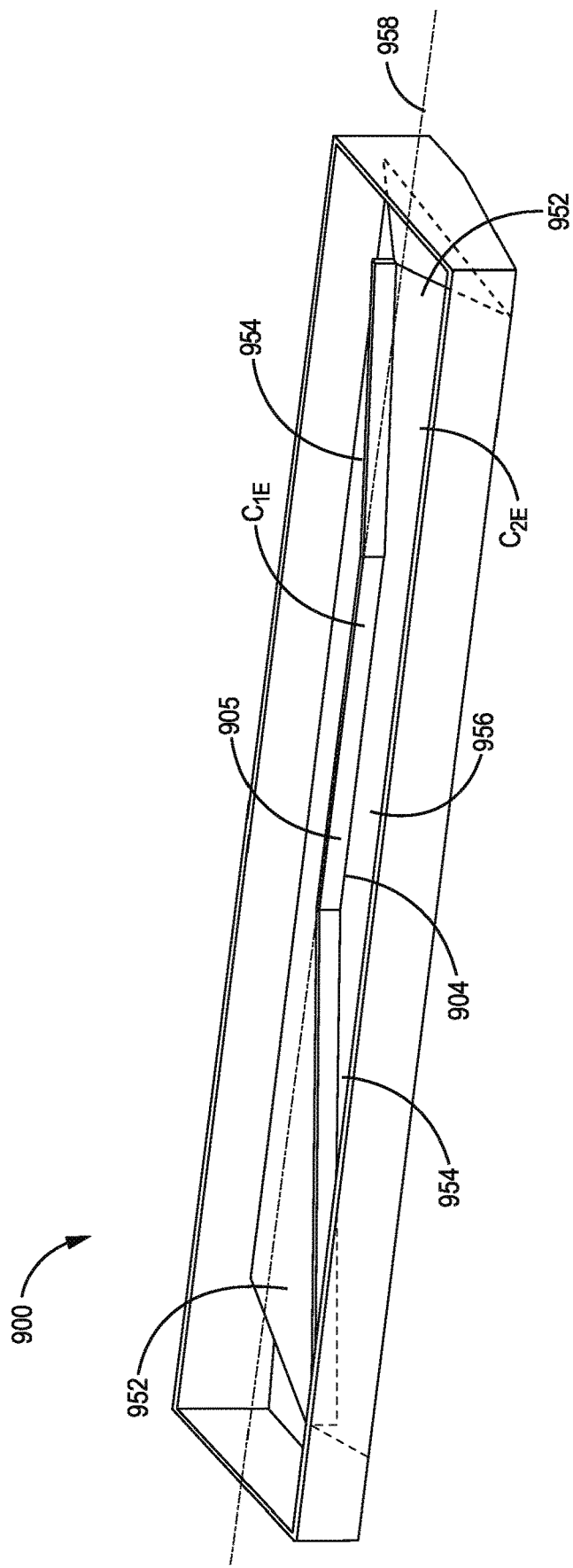
FIG. 9 is a schematic diagram of a raceway with an apex and a divider extending upward from the apex and recovery zones with a sloped floor, according to one or more embodiments of the present disclosure.

FIG. 9 is a schematic diagram of a raceway 900 with a first channel $C_{1E}$, a second channel $C_{2E}$, an apex 904 and a divider 905 extending upward from the apex 904 and recovery zones with a sloped floor, according to one or more embodiments of the present disclosure. As shown in FIG. 9, the channels $C_{1E}$ and $C_{2E}$ have a symmetric configuration, wherein each channel includes an expansion zone 952 at the outlet end and a contraction zone 954 at an inlet end and wherein the corresponding expansion regions 952 of the two channels have the same cross-sectional area and/or angle relative to a horizontal axis line 958 along the lengths of the channels. In other words, fluid flowing through the raceway 900 shown in FIG. 9 flows through a non-expansion region 956 to an expansion region 952 at an outlet end of a first channel $C_{1E}$, where it enters the recovery zone and exits the recovery zone through a contraction region 954 at an inlet end of a second channel $C_{2E}$. From the inlet end of the second channel $C_{2E}$, the fluid flows through a non-expansion region 956 to an expansion region 952 of the second channel $C_{2E}$, where it enters the recovery zone at an opposing end and exits the recovery zone through a contraction region 954 at an inlet end of the first channel $C_{1E}$.

The embodiments described herein shall not be limiting as a person skilled in the art would readily understand that each of the numerous features of the raceways described herein may be implemented in the raceways of the present disclosure in any of numerous possible combinations. For example, in some embodiments, a recovery zone with a sloped floor may be included in the raceway, whereas in other embodiments, a recovery zone without a sloped floor may be more desirable.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A raceway for shrimp production, comprising:
   a sloped base with an apex,
   a divider extending upward from the apex,
   two side walls, each opposing and parallel to the divider sufficient to form two elongated channels on the sloped base; and
   at least two tapered ends in fluid communication with the channels, each tapered end configured as a recovery zone and comprising:
      an end wall,
      a pit,
      a sloped floor extending from the sloped base to the end wall or pit and arranged between the sloped base and the pit such that the sloped floor has a downward slope of an angle of 1 to 45 degrees relative to a vertical reference towards one or more of the end walls and is in contact with the tapered ends to increase a cross-sectional area of the channel; wherein the sloped floor meets the sloped base at a first point at the two side walls and at a second point at the apex and the first point is closer to the end wall than the second point;

the end walls including an inlet where a pump supplies fluid to the raceway, the inlet being provided in-line with an outlet channel;

the sloped base having an angle of about 6 degrees to about 8 degrees relative to the horizontal axis; and a collection zone located in the pit, the collection zone comprising one or more openings, and a filter or screen in the one or more openings for the collection of molts.

2. The raceway of claim 1, wherein the divider minimizes turbulent flow in each of the channels.

3. The raceway of claim 1, wherein the length of the divider and apex is the same.

4. The raceway of claim 1, wherein a length of the divider is less than a length of the apex.

5. The raceway of claim 1, wherein the channels have a symmetric configuration.

6. The raceway of claim 1, wherein the channels have an asymmetric configuration.

7. The raceway of claim 1, wherein each channel includes one or more of an expansion zone, a contraction zone, and a non-expansion zone.

8. The raceway of claim 7, wherein the expansion zone encourages settling of molts and the contraction zone increases a fluid flow rate.

9. The raceway of claim 1, wherein each of the two channels includes an expansion region and a contraction region and the corresponding expansion regions and contraction regions of the two channels have the same cross-sectional area and/or angle relative to a horizontal axis line along the length of the channels.

10. The raceway of claim 1, wherein one or more of the tapered ends are configured as a recovery zone that encourages settling of molts.

11. The raceway of claim 1, wherein the raceway collects molts.

12. A raceway for removal of components that are present and/or generated during shrimp production, the raceway comprising:

first and second side walls arranged in parallel;

first and second end walls arranged in parallel and oriented generally perpendicular to each of the first and second side walls;

a sloped base arranged between the first and second side walls and having an apex, the apex extending between the first and second end walls, and at least a portion of the apex is parallel to the first and second side walls;

a first channel formed between the first sidewall and the apex;

a second channel formed between the second side wall and the apex; and a tapered end in fluid communication with the first and second channels, the tapered end configured as a recovery zone and further comprising:

a sloped floor extending downward from the sloped base toward the first or second end wall at an angle of 1 to 45 degrees relative to a vertical reference; wherein the sloped floor meets the sloped base at a first point at the two side walls and at a second point at the apex and the first point is closer to the end wall than the second point;

the sloped base having an angle of about 6 degrees to about 8 degrees relative to the horizontal axis;

a pit located between the sloped floor and the first or second end wall, the pit configured for collecting molts; and a collection zone located in the pit, the collection zone comprising one or more openings, a filter of screen in the one or more openings for the collection of molts, wherein the end walls including an inlet where a pump supplies fluid to the raceway, the inlet being provided in-line with an outlet channel; and wherein the sloped floor is arranged between the sloped base and the pit such that the sloped floor is in contact with the tapered ends to increase a cross-sectional area of the channel.

13. The raceway of claim 12, further comprising:

a divider extending upward from the apex.

14. The raceway of claim 12 wherein each of the first and second channels includes one or more of an expansion zone, a contraction zone and a non-expansion zone for controlling a flow rate of a fluid flowing through the first and second channels.

* * * * *